United States Patent
Dai et al.

(10) Patent No.: US 8,103,890 B2
(45) Date of Patent: Jan. 24, 2012

(54) ENERGY SAVING METHOD AND ELECTRONIC DEVICE WITH OPTICAL DISC REPRODUCTION APPARATUS

(75) Inventors: Lung Dai, Taipei Hsien (TW); Kun Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 510 days.

(21) Appl. No.: 12/324,846

(22) Filed: Nov. 27, 2008

(65) Prior Publication Data

US 2009/0172436 A1    Jul. 2, 2009

(30) Foreign Application Priority Data

Dec. 27, 2007    (CN) .......................... 2007 1 0203449

(51) Int. Cl.
G06F 1/32    (2006.01)

(52) U.S. Cl. ....................................... 713/323; 713/324

(58) Field of Classification Search .................. 713/323, 713/324

See application file for complete search history.

(56) References Cited

U.S. PATENT DOCUMENTS

| | | | |
|---|---|---|---|
| 5,233,438 A * | 8/1993 | Funahashi et al. | 386/201 |
| 5,768,164 A * | 6/1998 | Hollon, Jr. | 708/174 |
| 6,116,767 A * | 9/2000 | Chaiken et al. | 710/15 |
| 6,711,631 B1 * | 3/2004 | Chan et al. | 710/14 |
| 7,114,090 B2 * | 9/2006 | Kardach et al. | 713/323 |
| 7,309,826 B2 * | 12/2007 | Morley et al. | 84/483.1 |
| 7,418,610 B2 | 8/2008 | Tse | |
| 7,601,906 B2 * | 10/2009 | Craig et al. | 84/611 |
| 7,861,099 B2 * | 12/2010 | Theocharous et al. | 713/300 |
| 2007/0110409 A1 * | 5/2007 | Yoshii | 386/126 |

FOREIGN PATENT DOCUMENTS

| | | |
|---|---|---|
| CN | 2765286 Y | 3/2006 |
| CN | 1979383 A | 6/2007 |
| JP | 2005084215 A * | 3/2005 |

* cited by examiner

*Primary Examiner* — Thuan Du

(74) *Attorney, Agent, or Firm* — Altis Law Group, Inc.

(57) ABSTRACT

An electronic device for selectively reproducing information. The electronic device includes a display, a power supply for supplying power, a switch, and a processor. The switch is connected to the display and the power supply. The processor is connected to the switch. When the processor identifies that the selected information is audio type, the processor turns off the switch to disconnect an electrical connection between the power supply and the display. A power saving method for reducing the energy consumption of the electronic device is also provided.

10 Claims, 7 Drawing Sheets

ENERGY SAVING METHOD AND ELECTRONIC DEVICE WITH OPTICAL DISC REPRODUCTION APPARATUS

BACKGROUND

1. Field of the Disclosure

The present disclosure generally relates to an electronic device using a power saving method to reduce the energy consumption.

2. Description of Related Art

Electronic devices, such as disc players, portable computers or televisions are widely used to reproduce video and audio signals. In these electronic devices, a display and a speaker are used simultaneously for outputting video and audio signals. However, in some circumstances, only audio entertainment is desired and the video output is unnecessary, thus having both audio and video in this case results in a waste of energy.

Therefore, an energy saving method used in an electronic device is needed in the industry to address the aforementioned deficiency.

SUMMARY

An electronic device is for selectively reproducing information. The electronic device includes a display, a power supply for supplying power, a switch, and a processor. The switch is connected to the display and the power supply. The processor is connected to the switch. When the processor identifies that the selected information is audio type, the processor turns off the switch to disconnect an electrical connection between the power supply and the display. A power saving method for reducing the energy consumption of the electronic device is also provided.

Other advantages and novel features of the present invention will become more apparent from the following detailed description of preferred embodiment when taken in conjunction with the accompanying drawings.

DETAILED DESCRIPTION

Figure 1:
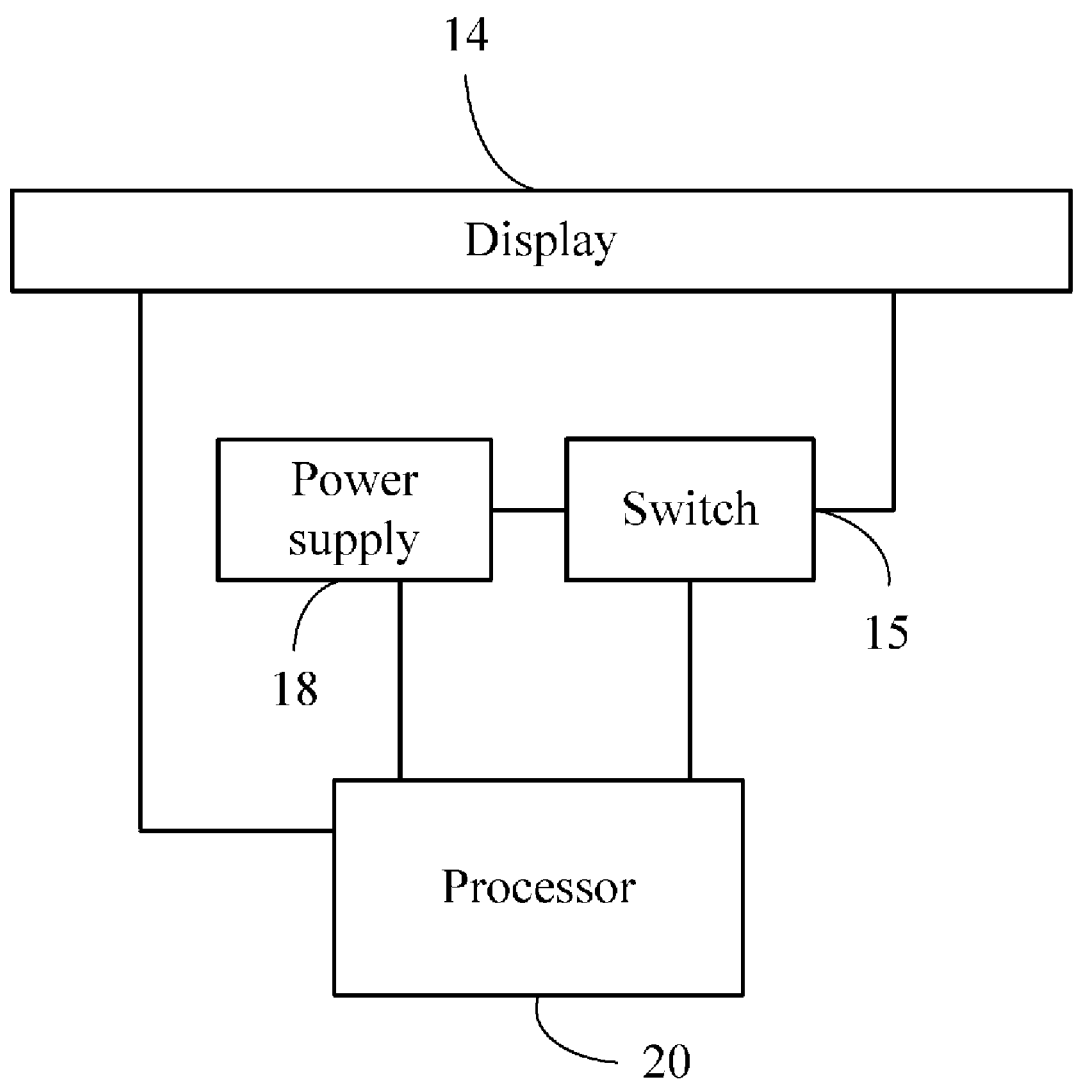
FIG. 1 is a block diagram showing an electronic device in accordance with an exemplary disclosure.

Referring to FIG. 1, an electronic device 100 includes a display 14, a switch 15, a power supply 18, and a processor 20. The switch 15 is connected between the display 14 and the power supply 18. The power supply 18 supplies power to the display 14 via the switch 15. When the electronic device 100 reproduces audio signals exclusively, the processor 20 signals the switch 15 to disconnect an electrical connection between the power supply 18 and the display 14 to avoid unnecessary power consumption.

Figure 2:
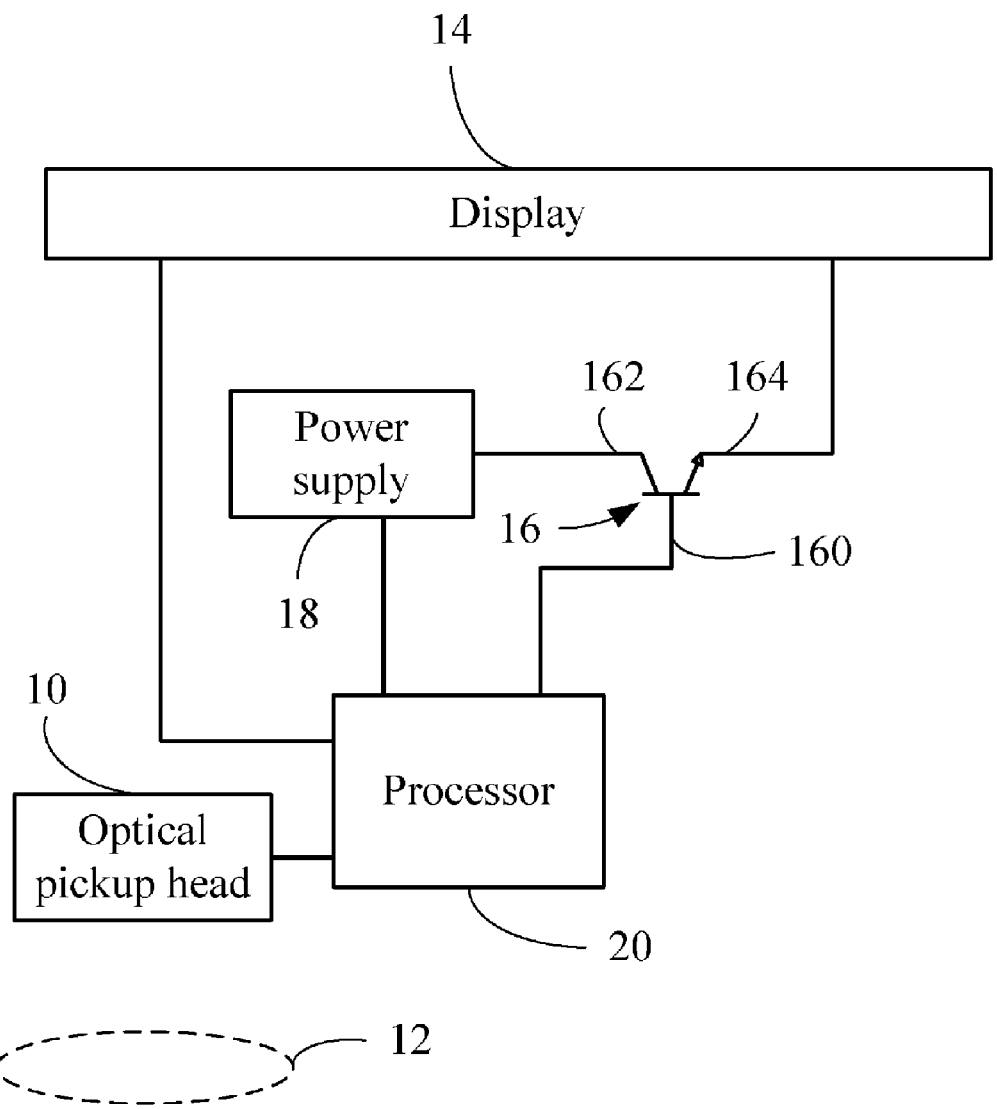
FIG. 2 is a schematic block diagram showing a first embodiment of the electronic device.

Also referring to FIG. 2, an electronic device 200 in accordance with a first embodiment is illustrated. In the first embodiment, the electronic device 200 adopts an optical pickup head 10 to read information from an optical disk 12, and also adopts a bipolar junction transistor (BJT) 16 to function as the switch 15. The switch 15 may also be metal oxide semiconductor field effect transistors (MOSFETs).

The base 160 of the BJT 16 is connected to the processor 20, the collector 162 is connected to the power supply 18, and the emitter 164 is connected to the display 14. The processor 20 is connected to the optical pickup head 10, the display 14, and the power supply 18.

The optical pickup head 10 reads information recorded in the optical disk 12. The optical disk 12 stores video and audio type information. When the optical pickup head 10 reads that the information is video type information, the processor 20 generates a high level signal to the base 160 of the BJT 16. The BJT 16 is turned on, and then delivers power from the power supply 18 to the display 14. The display 14 is powered on, and the video information is displayed. When the optical pickup head 10 reads that the information is audio type information, the processor 20 generates a low level signal to the base 160 of the BJT 16. The BJT 16 is turned off and this disconnects the electrical connection between the power supply 18 and the display 14. The display 14 is powered off, and the audio information is outputted by speakers (not shown).

In the embodiment, the processor 20 is used to detect the type of the optical disk 12. When the optical disk 12 is identified as an audio type, the processor 20 turns off the switch 16 to power off the display 14. Therefore, the energy consumption of the electronic device 200 is reduced.

Figure 3:
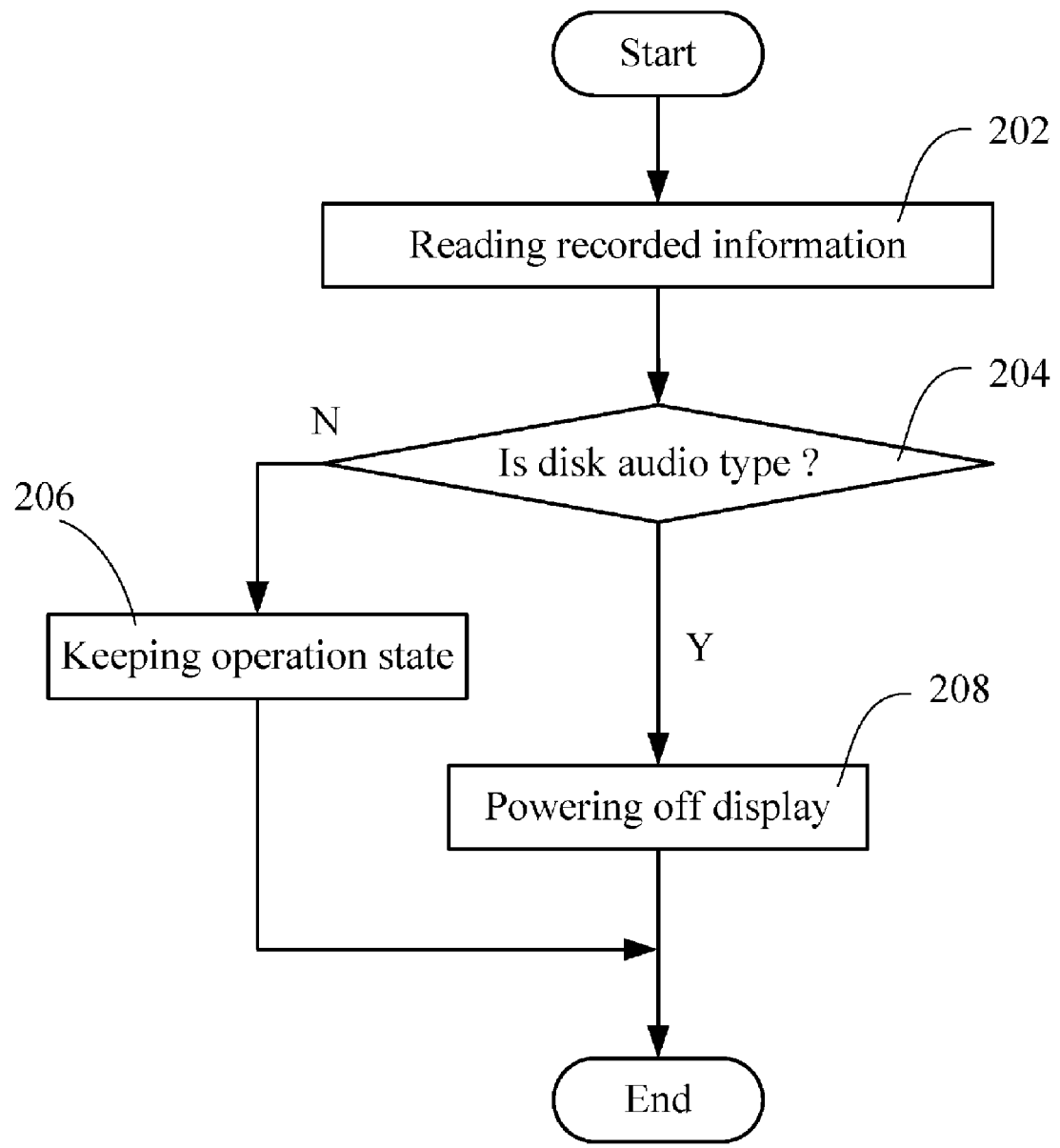
FIG. 3 is a flowchart showing a power saving method for the first embodiment of the electronic device.

Further referring to FIG. 3, a power saving method for the electronic device 200 is illustrated as follows.

In step 202, the information recorded in the optical disk 12 is read.

In step 204, the processor 20 identifies whether the optical disk 12 is an audio type disk.

In step 206, if the optical disk 12 is not an audio type disk, the display 14 is kept in its operation state.

In step 208, if the disk 12 is an audio type disk, the display 14 is powered off.

Figure 4:
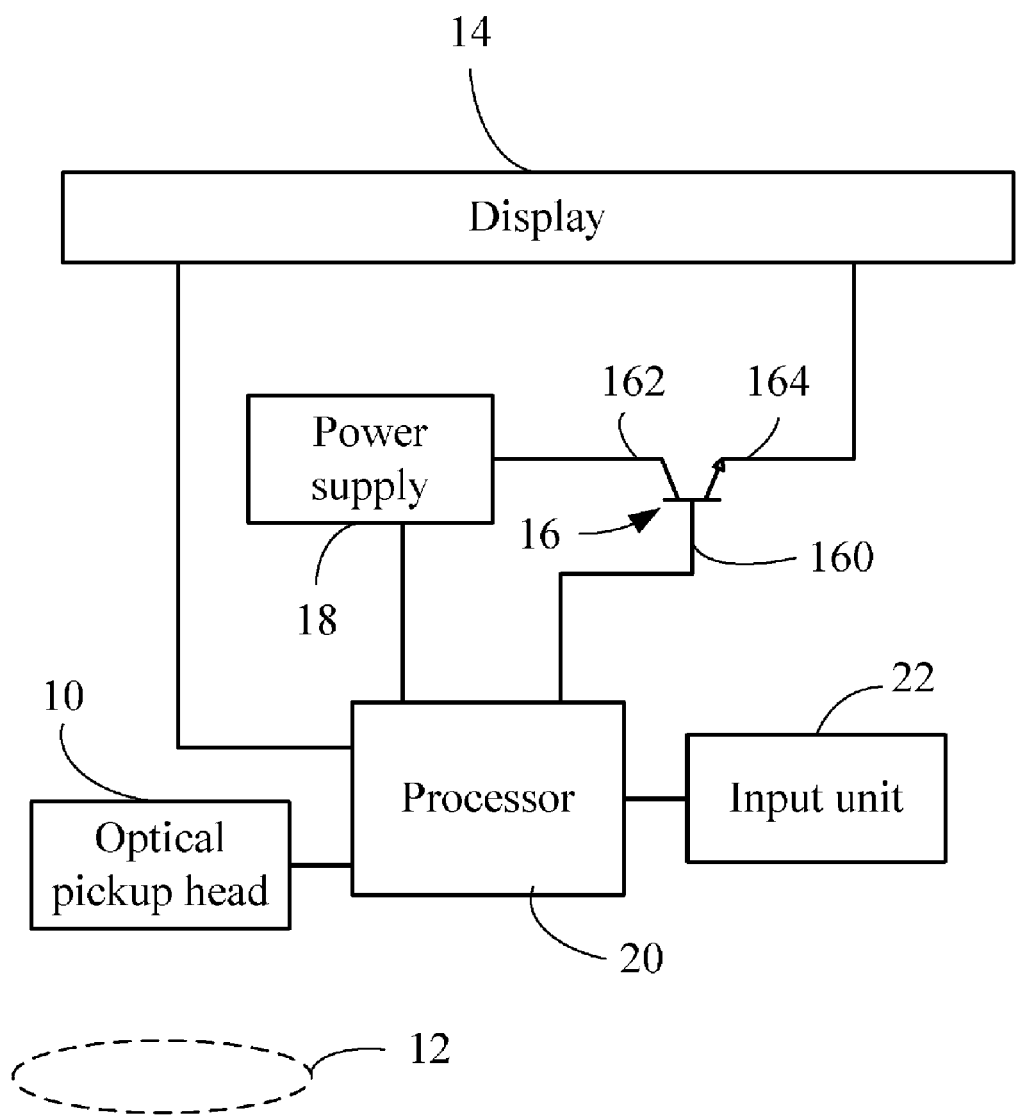
FIG. 4 is a schematic block diagram showing a second embodiment of the electronic device.

Also referring to FIG. 4, an electronic device 300 in accordance with a second embodiment is illustrated. In comparison with the electronic device 200 of the first embodiment, the electronic device 300 includes an additional component, an input unit 22. The input unit 22 is configured for receiving function selecting inputs.

On the basis of the operational principle of the electronic device 200, when detecting the video type information, the processor 20 turns on the BJT 16. The BJT 16 delivers power from the power supply 18 to the display 14. The display 14 is powered on to reproduce the to-be-produced information in the video form. When detecting the audio type information, the processor 20 keeps the BJT 16 turned on and signals the display 14 to display a function selecting menu (not shown). The function selecting menu includes at least two options, one of which is "lyrics-on", while the other is "lyrics-off". After that, the processor 20 further detects whether the function selecting inputs are received by the input unit 22.

If the input unit 22 receives a lyrics-on signal, the processor 20 controls the power supply 18 to supply a low level voltage to the display 14. The display 14 is powered on and displays lyrics in a low rumination to reduce the energy consumption. If the input unit 22 receives a lyrics-off signal, the processor 20 turns off the BJT 16 to disconnect the electrical connection between the power supply 18 and the display 14. The display 14 does not display the lyrics.

Figure 5:
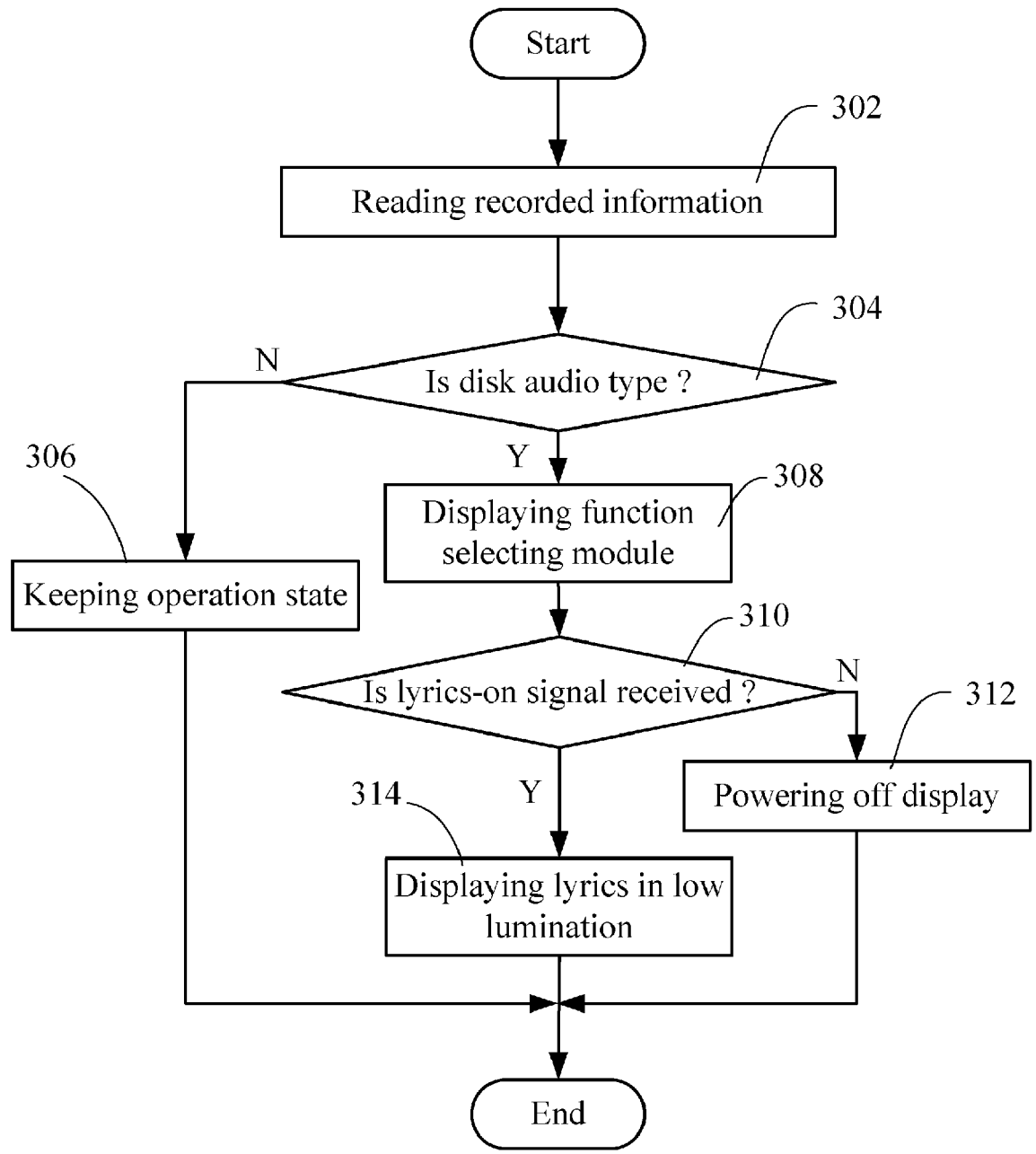
FIG. 5 is a flowchart showing a power saving method for the second embodiment of the electronic device.

Also referring to FIG. 5, a power saving method for the electronic device 300 is illustrated as follows.

In step 302, the information recorded in the optical disk 12 is read.

In step 304, the processor 20 identifies whether the optical disk 12 is an audio type disk.

In step 306, if the optical disk 12 is not an audio type, the display 14 is kept in its operation state.

In step 308, if the disk 12 is an audio type disk, the processor 20 signals the display 14 to display a function selecting menu.

In step 310, the processor 20 detects whether the lyrics-on signal is received.

In step 312, if the lyrics-on signal is not received, the processor 20 disconnects the electrical connection between the power supply 18 and the display 14, and the display 14 is powered off.

In step 314, if the lyrics-on signal is received, the display 14 displays lyrics in a low lumination.

Figure 6:
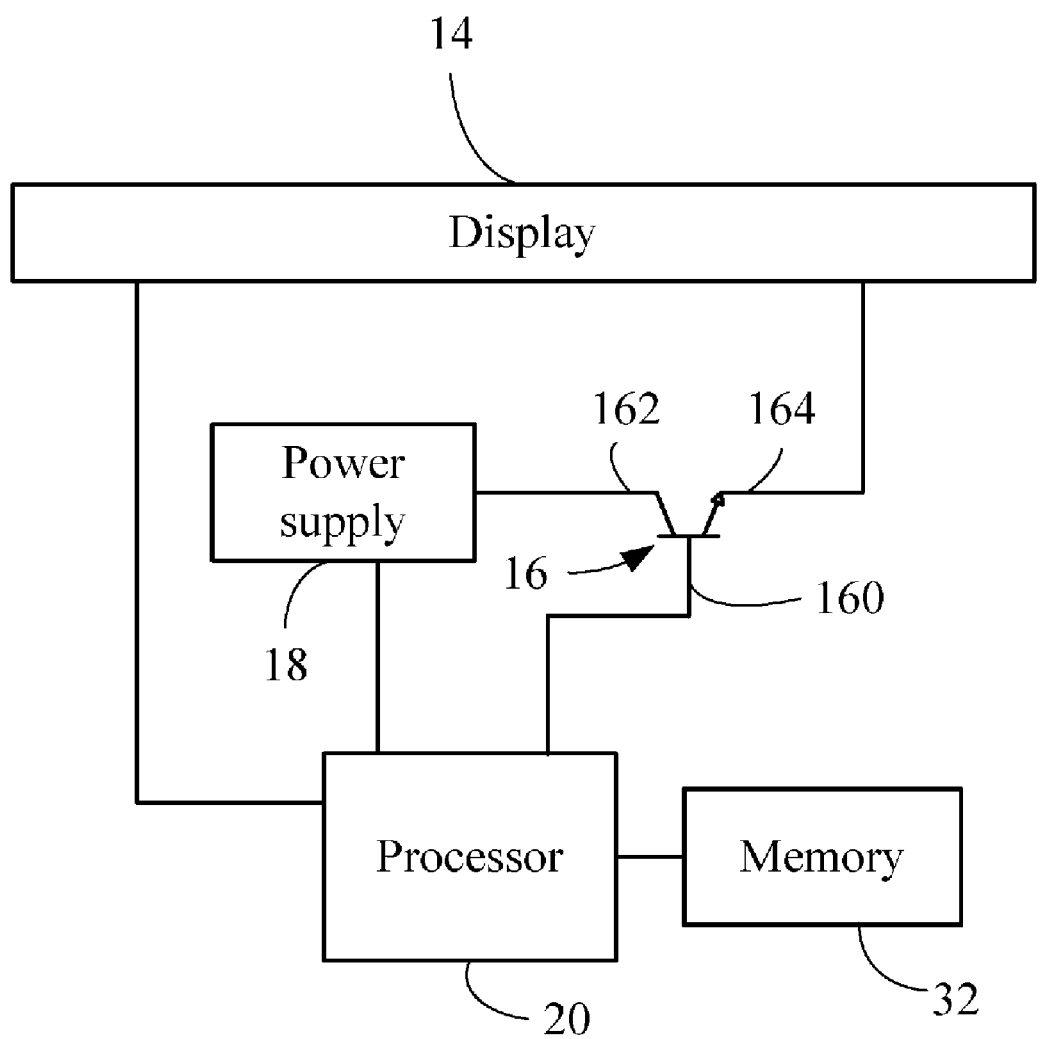
FIG. 6 is a schematic block diagram showing a third embodiment of the electronic device.

Referring to FIG. 6, an electronic device 400 in accordance with a third embodiment is illustrated. In comparison with the electronic device 200 of the first embodiment, the electronic device 400 eliminates the optical pickup head 10 but adds a memory 32. The memory 32 stores audio format files, such as window media audio (WMA) files, MPEG-1 audio layer 3 (MP3) files, and video format files, such as audio video interleave (AVI) files, windows media video (WMV) files. Each file comprises audio or video type information. The audio type information indicates the audio format files, and the video type information indicates the video format files. When reading the video format files, the processor 20 turns on the BJT 16 to power on the display 14. When reading the audio format files, the processor 20 turns off the BJT 16 to power off the display 14.

Figure 7:
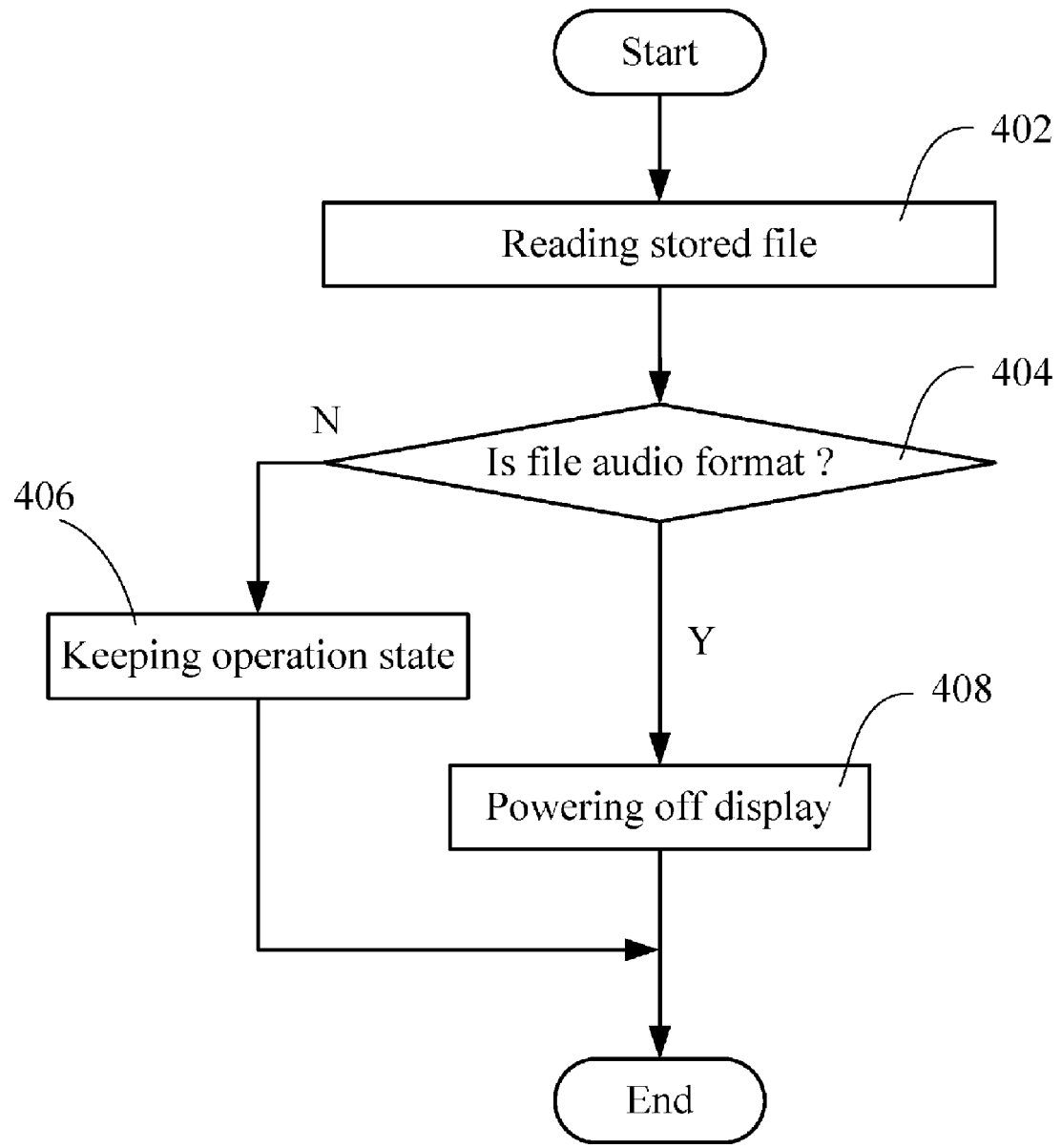
FIG. 7 is a flowchart showing a power saving method for the third embodiment of the electronic device.

Also referring to FIG. 7, a power saving method for the electronic device 400 is illustrated as follows.

In step 402, a file stored in the memory 32 is read.

In step 404, the processor 20 identifies whether the file is an audio format.

In step 406, if the file is not an audio format, the display 14 is kept in its operation state.

In step 408, if the file is an audio format, the display 14 is powered off.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device for selectively reproducing information, the electronic device comprising:
a display;
a power supply for supplying power;
a switch connected between the display and the power supply;
a processor connected to the switch, the processor directly connected to the display for providing video information to the display to be displayed; and
an input unit for receiving a lyrics-on signal when the processor identifies that the selected information is audio type;
wherein when the processor identifies that the selected information is audio type, the processor turns off the switch and disconnects an electrical connection between the power supply and the display; when the input unit receives the lyrics-on signal, the processor controls the power supply to supply a low level voltage to make the display lyrics in a low lumination to reduce the energy consumption.

2. The electronic device according to claim 1, further comprising an optical pickup head for reading the selected information from an optical disk.

3. The electronic device according to claim 1, wherein the input unit is further used for receiving a lyrics-off signal when the processor identifies that the selected information is audio type.

4. The electronic device according to claim 3, wherein when the input unit receives the lyrics-off signal, the processor turns off the switch to disconnect the electrical connection between the power supply and the display.

5. The electronic device according to claim 1, further comprising a memory for storing the selected information in audio format files or video format files.

6. The electronic device according to claim 1, wherein the switch is a BJT, of which the base is connected to the processor, the collector is connected to the power supply, and the emitter is connected to the display.

7. A power saving method for reducing the energy consumption of an electronic device in selectively reproducing information, the power saving method comprising:
reading the selected information;
detecting an audio type of the selected information;
displaying a function selecting menu comprising a lyrics-on option and a lyrics-off option;
detecting a lyrics-on signal; and
displaying lyrics in a low lumination to reduce the power consumption.

8. The power saving method according to claim 7, further comprising:
detecting a lyrics-off signal; and
powering off the display of the electronic device.

9. The power saving method according to claim 7, wherein the selected information is recorded in an optical disk.

10. The power saving method according to claim 7, wherein the selected information is stored in a memory in an audio or video format.

* * * * *